United States Patent
Gupta et al.

(10) Patent No.: US 6,567,667 B1
(45) Date of Patent: May 20, 2003

(54) DOMAIN SELECTING SYSTEM AND METHOD

(75) Inventors: Sanjay Gupta, Lakewood, IL (US); Stephen Spear, Skokie, IL (US); Kanapathipillai Ketheesan, Foster City, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/644,916

(22) Filed: Aug. 23, 2000

Related U.S. Application Data

(60) Provisional application No. 60/150,303, filed on Aug. 23, 1999.

(51) Int. Cl.$^7$ ............................................. H04Q 7/20
(52) U.S. Cl. ..................... 455/445; 455/422; 455/434; 455/466
(58) Field of Search ................. 455/414, 422, 455/426, 432, 434, 436, 466, 558, 445; 379/355; 370/392, 471, 475, 329

(56) References Cited

U.S. PATENT DOCUMENTS

| | | | |
|---|---|---|---|
| 5,533,026 A | | 7/1996 | Ahmandi et al. |
| H1641 H | * | 4/1997 | Sharman ................. 455/466 H |
| 5,729,537 A | * | 3/1998 | Billstrom ..................... 370/392 |
| 5,796,727 A | * | 8/1998 | Harrison et al. ............ 455/436 |
| 5,920,822 A | * | 7/1999 | Houde et al. ................ 455/466 |
| 6,058,311 A | * | 5/2000 | Tsukagoshi ................. 455/432 |
| 6,195,705 B1 | * | 2/2001 | Leung ......................... 455/426 |
| 6,222,829 B1 | * | 4/2001 | Karlsson et al. ............ 370/329 |

FOREIGN PATENT DOCUMENTS

| | | |
|---|---|---|
| EP | 0 852 448 A1 | 7/1998 |
| WO | WO 01/03454 A1 | 1/2001 |

OTHER PUBLICATIONS

"3$^{rd}$ Generation Partnership Project (3GPP); Technical Specification Group (TSG) RAN; UTRAN Overall Description" 3G TS 25.401 V1.1.1 (Jul. 1999), Jul. 1, 1999, pp. 16–25.
Nortel Networks "Draft Technical Report : Turbo Charger" TSGW3#4(99)557, Jun. 1999, pp 1–12.

* cited by examiner

Primary Examiner—Nay Maung
(74) Attorney, Agent, or Firm—Randall S. Vaas; Steven A. May

(57) ABSTRACT

A cellular system (100) includes network equipment (102, 104) and user equipment (106). The network equipment can operate to inspect incoming messages from user equipment to identify service applications and direct incoming messages using the domain specified by the user equipment. User equipment can operate to construct messages for communication to a base station, which messages specify one of the circuit switch service domain (206) and the packet switch service domain (204) for the service and transmitting the constructed message to the base. According to one aspect of the system, the network equipment can transmit application and service information to the user equipment, responsive to which the user equipment can select the preferred domain for a message or session.

40 Claims, 3 Drawing Sheets

DOMAIN SELECTING SYSTEM AND METHOD

This application claims the benefit of No. 60/150,303, filed Aug, 23, 1999.

FIELD OF THE INVENTION

The present invention pertains to methods and systems for service domain selection, and more particularly to methods and systems for wireless cellular systems.

BACKGROUND OF THE INVENTION

In the third generation mobile telephone communication systems that are being defined by various standardization bodies, two distinct switch domains have been identified for the networks servicing user equipment (UE). These domains are the circuit switched (CS) service domain and the packet switched (PS) service domain. In the circuit switch domain signals are physically routed to the appropriate destination through a unique connection whereas in the packet switch domain message packets are routed to the appropriate destination based on addresses in the packet. These domains are distinct and are implemented using different equipment.

One problem encountered designing third generation (3G) cellular networks is accommodating user equipment services implemented in both the circuit switch and packet switch domains. The first releases of third generation standards specify implementing services in both domains. Furthermore, the services offered by the access network to all core network domains in 3G systems are the same. Given that real time services are migrating from circuit switched networks to packet switched networks in wire-line telecommunications, it appears that a similar migration must be supported in cellular networks. For example, it is expected that certain services such as conventional cellular speech are likely to be offered initially in the circuit switched domain and later in the packet switched domain.

Additionally, the third Generation Partnership Project (3GPP) proposed architecture has a well-defined separation between the access stratum (AS) and the non-access stratum (NAS). The mobile and network portion of the access stratum does not inspect or manipulate the contents of the non-access stratum message. The non-access stratum portion of a message in the mobile to network direction uses a core network (CN) domain identifier. However, the mobile, or user equipment, does not know the core network architecture, and therefore does not know whether there are one or two domains, or what services are available, and more particularly what services are available in each domain. As a consequence, the mobile is forced to support a predetermined mapping of services to domains; such as all speech messages are mapped to the circuit switch domain. This limits the ability of the overall system to handle calls and support services in an optimum and easily upgradeable manner.

The 1999 release (R99) of the third generation partnership project (3GPP) provides hooks for the mobile to address messages to a specific domain. Additionally, this release acknowledges that there may be a migration of some services from the circuit switch-domain to the packet switch-domain, and that there should be flexibility to support this migration that is compatible with previous systems. However, processes for the transparent migration of services and applications between domains are not specified.

It has been proposed to add a new information element, which is a core network domain indicator, to the access stratum part of the radio resource control (RRC) messages to indicate to which core network a message belongs. In the downlink, the serving radio network controller (SRNC) would insert this information element into the access stratum portion of the radio resource control direct transfer message. In the uplink, the user equipment would insert this information element into the access stratum portion of the radio resource control, enabling the serving radio network controller to decide to which domain the non-access stratum direct transfer message should be routed. However, such an arrangement does not support flexibility.

What is needed is a system for accommodating migration between the circuit switch and packet switch domains that is more flexible.

DETAILED DESCRIPTION OF THE DRAWINGS

A cellular system includes network equipment and user equipment. The network equipment can operate to inspect incoming messages from user equipment to identify service applications and direct incoming messages using the domain specified by the user equipment. User equipment can operate to construct messages for communication to the network equipment, which messages specify one of the circuit switch domain and the packet switch domain for the service, and transmit the constructed message to the base. According to one aspect of the system, the network equipment can transmit application and service information to the user equipment, responsive to which the user equipment can select the preferred domain for a message or session.

The invention provides a smooth migration path for a cellular operator from circuit switched to packet switched technologies. To this end it provides a mechanism to transparently migrate services from one domain to another in systems including the third generation mobile systems, and it provides operators with a means to selectively migrate their network from a mixture of circuit switched domain and packet switch domain to an all-internet protocol packet switched network over a period of time, and on a staggered basis, with flexibility of experimentation and trials.

It is imperative that operators have the ability to selectively migrate portions of their network as well as services and applications. For example, it should be possible to configure a certain base site controller to process speech calls in the packet switch domain while the rest of the network processes speech calls in the circuit switch domain. In another example, it should be possible to process short message services (SMS) in the packet switch domain, and speech calls in the circuit switch domain.

Figure 1:
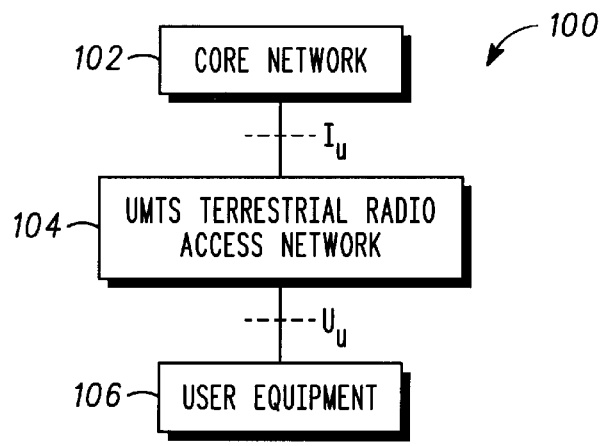
FIG. 1 is circuit schematic in block diagram form illustrating a cellular system.

More particularly, a system 100 is disclosed in FIG. 1. The system includes user equipment 100. The user equipment may, for example, be a mobile telephone with a subscriber identity module (SIM) in a global system for mobile communications (GSM) system. The user equipment is connected through a radio interface Uu to a UMTS terrestrial radio access network (UTRAN) 104. It will be recognized that the UMTS terrestrial radio access network can be advantageously employed in any radio access network, such that the invention is not limited to third generation systems. The UMTS terrestrial access network may for example include a radio network layer and a transport network layer. The UMTS terrestrial access network 104 includes a radio network subsystem (RNS) connected to the core network 106 at an interconnection point Iu. The radio network subsystem of the UMTS terrestrial access network 104 may either be a full system network or only the access part of a Universal Mobile Telephone System (UMTS) network offering the allocation and the release of specific radio resources to establish means of connection between user equipment and the UMTS terrestrial access network. The radio network subsystem thus by way of example contains a radio network controller (RNC) and is responsible for the resources and transmission/reception in a set of cellular telephone cells.

Figure 2:
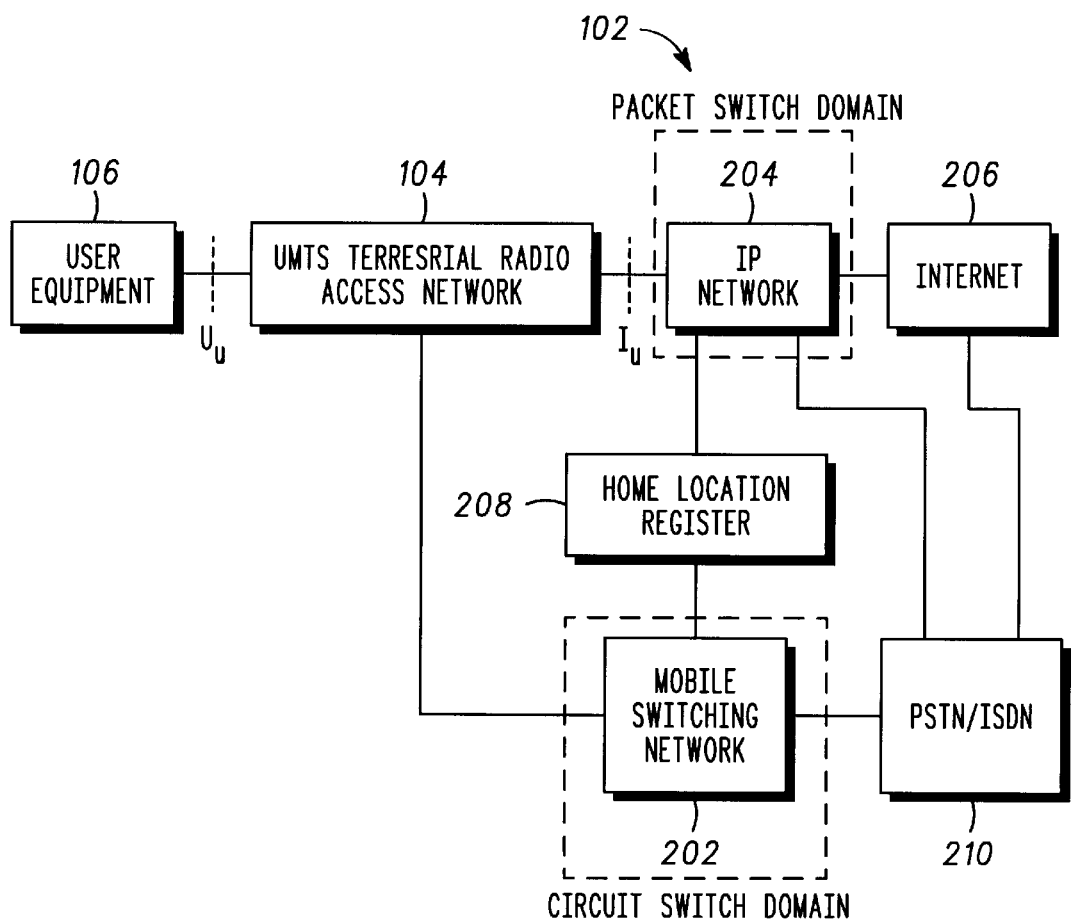
FIG. 2 is a circuit schematic in block diagram form illustrating an implementation of the system according to FIG. 1.

The core network 102 includes a circuit switch domain 202 (FIG. 2) and packet switch domain 204. These domains are connected to the home location register (HLR) 208. The UMTS terrestrial radio access network distributes messages, or alternatively call sessions, to the circuit switch domain and packet switch domain. For example, the circuit switch domain may be a mobile switching center 202 and the packet switch domain may be an IP network (including one or more Serving GPRS Support Node (SGSN), router, border gateway (BG), and GGSN with IP call servers capable of providing circuit like services in the IP domain or into the PSTN domain with appropriate gateways. The circuit switch domain may thus encompass a mobile switching network coupled to the public switched telephone network (PSTN)/integrated services digital network (ISDN) 210 whereas the packet switch domain may encompass an internet protocol (IP) network coupled to the internet 206. The UMTS terrestrial access network can be connected to both of these domains or only one of the domains. The availability of these domains, and the services available through a particular domain, will vary from location to location. For example, at some locations voice over IP (VoIP) and circuit switched voice connections through the PSTN may be available, whereas at other sites, only PSTN voice service may be available.

The present invention gives operators control over migration of services from one domain to another. Several unique methods are provided by which the user equipment (UE) can be accommodated by packet switch and circuit switch domains, which methods will be described herein below. User equipment as used herein includes any equipment that can accommodate voice, data, voice and data, or the like, such as computers, mobile telephones, pagers, two-way radios with dispatch, personal digital assistants, or the like. Additionally, it will be recognized that each of the methods described herein below can be used individually or jointly with one another to gain additional flexibility and interoperability between the user equipment and the network.

Figure 3:
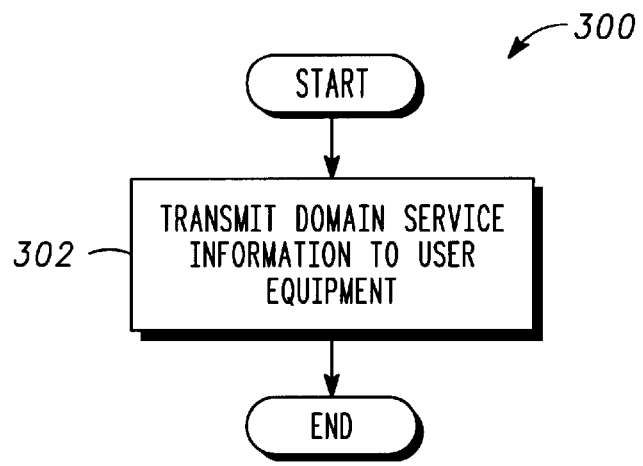
FIG. 3 is a flow chart illustrating operation of the UMTS terrestrial radio access network in FIGS. 1 and 2.
Figure 4:
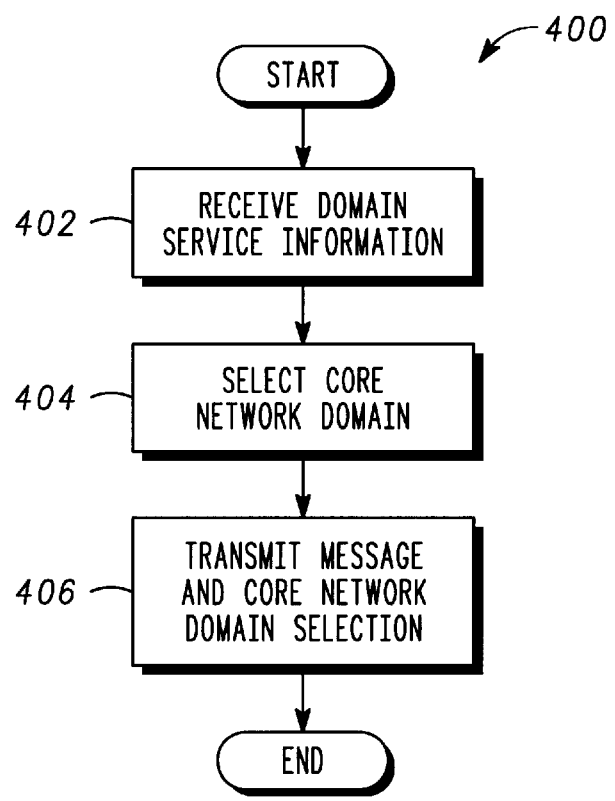
FIG. 4 is a flow chart illustrating operation of the user equipment in the FIGS. 1 and 2.

FIG. 3 shows a method 300 implemented by the UMTS terrestrial radio access network 104 for informing user equipment 106 of the resources available at a location. The method comprises transmitting domain, application and/or service availability information for the location, as indicated in step 302. This information is preferably provided in an existing signal, such as a network information signal broadcast to accepted user equipment in the cellular system. In this way, the information can be communicated to the user equipment 106 without substantially increasing the system overhead. The information may then be communicated to the user through a menu display system so that the user can select the service. For example, the user can select voice over IP instead of a PSTN connection to reduce the cost of a call.

It will be recognized that existing cellular systems broadcast, to all accepted user equipment, messages indicating the core network architecture. Step 302 represents the step of adding to such a signal the services and/or applications being supported by each of the core network domains, such as the packet switch domain and the circuit switch domain. In the 3GPP technical specification for example, there is a system information message that contains various system related parameters such as the cell identity, measurement information, channel structures, and the like. The network capability for services and domains can be added to this information. The user equipment can use this information to automatically decide the domain it wants to be serviced by for a particular message or session. Alternatively, the user equipment can be manually operated through a user input/output based on information in the communicated signal. The network capability that is operator configurable is thus communicated to the user equipment for use in accessing a communication system.

Alternatively, step 302 may be implemented in a targeted communication, such as in SIM toolkit signals communicated to user equipment in a GSM or UMTS system. SIM toolkits are employed in systems where user equipment operates with a subscriber identification module (SIM).

It will be recognized that Information can be added to the SIM tool kit signals communicated to the SIM via the user equipment that includes service and domain information. Those skilled in the art will recognize that the SIM tool kit gives operators direct-targeted access to user equipment on their system, such that the service, application and domain information may be communicated without significantly increasing the overhead of the system. The operator can use SIM toolkit to preferentially direct a service to a given domain on a user-by-user basis, with the request for the domain coming from the user equipment based on the directed service.

The user equipment 106 operates according to method 400 to select a core network domain for a message or a session. The mobile, as indicated in step 402, receives the domain service information. The user equipment uses the domain service information to select a domain for a particular message or session. This selection can be automatic based on programmed user preferences stored by the user or the service provider, and more particularly in user equipment memory or a SIM, or the user may manually select it. For example, the phone may be programmed to use voice over the internet (so called voice over IP) if it is available, such that the user equipment will automatically select this service, and thus the packet domain, when available in the user's location. Alternatively, the user may be informed of available rates for voice calls and voice over IP connections at the user's location via a message from the UMTS terrestrial access network. The user then manually selects the preferred domain, which information will be communicated to the UMTS terrestrial access network. Once the core network domain is selected, the message is constructed and transmitted with the identified domain information, as indicated in step 406.

Figure 5:
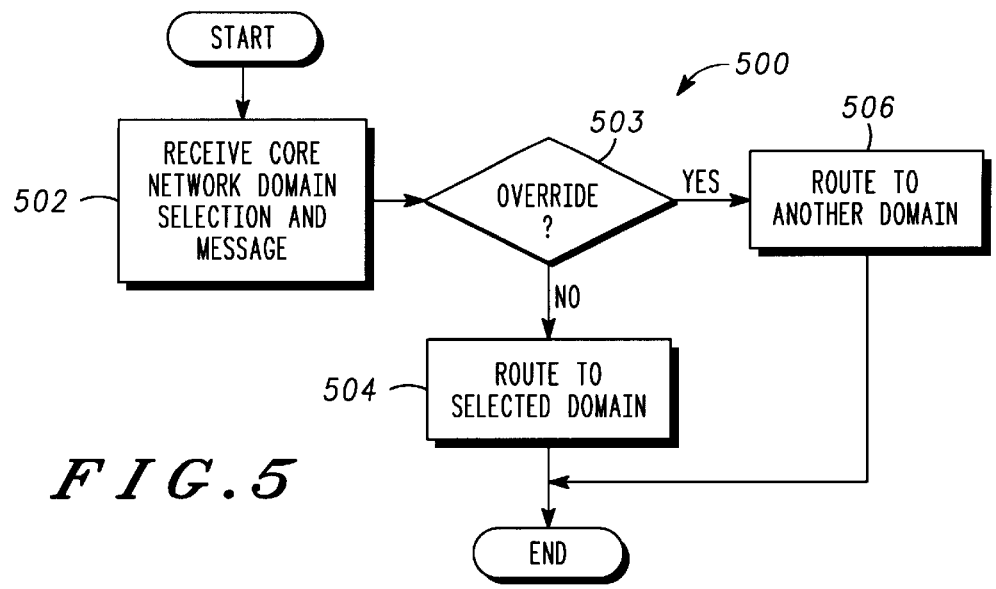
FIG. 5 is a flow chart illustrating further operation of the UMTS terrestrial radio access network in FIGS. 1 and 2.

The UMTS terrestrial access network will process the received message as indicated in method 500 (FIG. 5). In particular, the core network domain information is received from the user equipment, as indicated in step 502. The UMTS terrestrial access network can override the requested domain, as indicated in step 503. If the requested domain is accepted, the message, or session, will be routed to the selected domain as indicated in step 504. Alternatively, if the UMTS terrestrial access network overrides the selected domain, the service can be directed to another domain as indicated in step 506, or alternatively, the session or message can be aborted. It is envisioned that in the case of a conflict between the domains specified by the user equipment and the domain specified by the UMTS terrestrial access network, the access network can sends a clarifying message to the user equipment.

A decision by the UMTS terrestrial access network 104 to override the service domain selected by the user equipment may be made based upon operator-configured parameters. These parameters could be, for example, mapping of certain services and applications to certain domains, or routing certain percentages of calls to one domain, or routing calls to a domain that offers the lowest cost. There are two methods by which the access network can know the service and application being requested by the user equipment. The first method is by inspecting the non-access stratum message from the user equipment. This may be considered a violation of the layered protocol architecture principle. However, the access network is capable of providing this operation. The more preferred method uses an application indicator in the access stratum portion of the message. This new, additional indicator can be a new field in a known message already existing in known systems or combined with an existing field as described above.

An example of a signal that can be used for the additional indicator is the "CN Domain Indicator." In user equipment 106 terminated communication sessions, the CN Domain Indicator in the RANAP paging message is copied into the radio resource control-paging message. This is used by the user equipment to fill in the core network domain indicator in the access stratum portion of the subsequent uplink radio resource control direct transfer message. The serving radio network controller uses this additional indicator to route the RANAP direct transfer message to the correct domain.

In the user equipment 106 originated communication sessions, it is entirely up to the user equipment 106 to decide which core network domain indicator to use in the radio resource control direct transfer messages. It is envisioned that this decision can be made based on the type of application and/or the services that the end user has requested. For instance, if a regular speech call is requested, then the user equipment 106 will choose the circuit switch domain to be the core network domain indicator. However, having the user equipment locked to a fixed mapping limits the performance of the system. Accordingly, the association of services to a core network domain needs to be enhanced so that a given application or service need not be statistically associated to a particular domain.

If the user equipment 106 initiates a communication session without specifying a domain, it is left to the serving radio network controller in the radio access network 104 to decide what domain to use for the service and/or application. In order to make this decision, the serving radio network controller needs to know the type of application being requested. The core network domain indicator field is expanded to indicate the application type being requested. For example, possible applications include mobile specific call models, current land line call models, IP call models or multimedia call models, and the like. In the serving radio network controller of the UMTS terrestrial radio access network 104, a service provider configurable parameter maps each application and service to a domain, enabling the serving radio network controller to determine the domain. This configurable parameter in the serving radio network controller satisfies the requirement of transportable migration of service from one domain to another domain. This technique has the advantage that the UMTS terrestrial access network (serving radio network controller) determines the domain, thus operators have direct control over domain selection. It has the disadvantage that strict requirements in existing standards for separation of the access stratum and the non-access stratum portions of a message are somewhat violated by having application information in the access stratum portion of the radio resource control message.

Additionally, decision making involves both user equipment and the serving radio network controller. Since the potential for the default in the serving radio network controller (SRNS) to disagree with the request from the user equipment, there needs to be a means of selecting the domain to provide the service. If the requested domain can not meet the needs it will be directed to a domain that is able to meet the request. If however either domain can meet the service request then either the request of the user equipment or the serving radio network controller must be followed, or additional communications are required.

The alternate solution described herein above is for the radio access network 104 to broadcast messages to the user equipment 106, which messages contain information as to what services and application are being serviced by which domain. Based on the service and/or application that the end-user has requested on their device, and the broadcast system information about domains, services and applications, the user equipment selects the core network domain. This selection can then be used as the core network domain indicator in all the radio resource control direct transfer messages from user equipment 106 to the server radio network controller. Since system information messages can be changed on a per location or per area basis, operators have the flexibility to migrate services transparently to the user. An additional advantage of this system is that there is a clear separation between the access stratum and the non-access stratum. Decision making is localized to the user equipment 106, with the serving radio network controller providing the routing as requested. Operators control service migration only on a localized basis (for example some sites are migrated to the packet switch domain while the rest of the network is mixed in service basis, or a service such as short messaging service (SMS) can be migrated to the packet switch domain while speech is still in the circuit switch domain). The disadvantage of this system is that certain message elements need to be defined for the system information message to be supported.

In particular, the 3GPP system specifies that in the radio resource control protocol, messages from the non-access stratum are transparently transferred within the access stratum using the direct transfer procedure. In the two core network scenarios described, a distribution function in the user equipment and the serving radio network controller handle a core network discriminator to direct messages to the appropriate non-access stratum entity (i.e., the appropriate mobility management instance in the user equipment domain and the appropriate core network domain). In the downlink direction, the signaling bearers addressing is used to identify the originating core network domain (e.g., from core network node originating address). The process performed by the distribution function consists of adding one core network discriminator to the value corresponding to the originating core network domain and passing the non-access stratum message to the underneath protocol layers for transparent transfer to the user equipment.

The present invention can be applied to the 3GPP system by further specifying that the uplink handling of the core network domain indicator will be as follows. System information messages broadcast to user equipment will contain information as to what services and applications are being serviced by which domain. Based on the service a and/or application that the end-user has requested and the broadcast system information, the user equipment will select the domain. This will be used by the core network domain indicator in all of the radio resource control direct transfer messages from the user equipment to the serving radio network controller.

Figure 6:
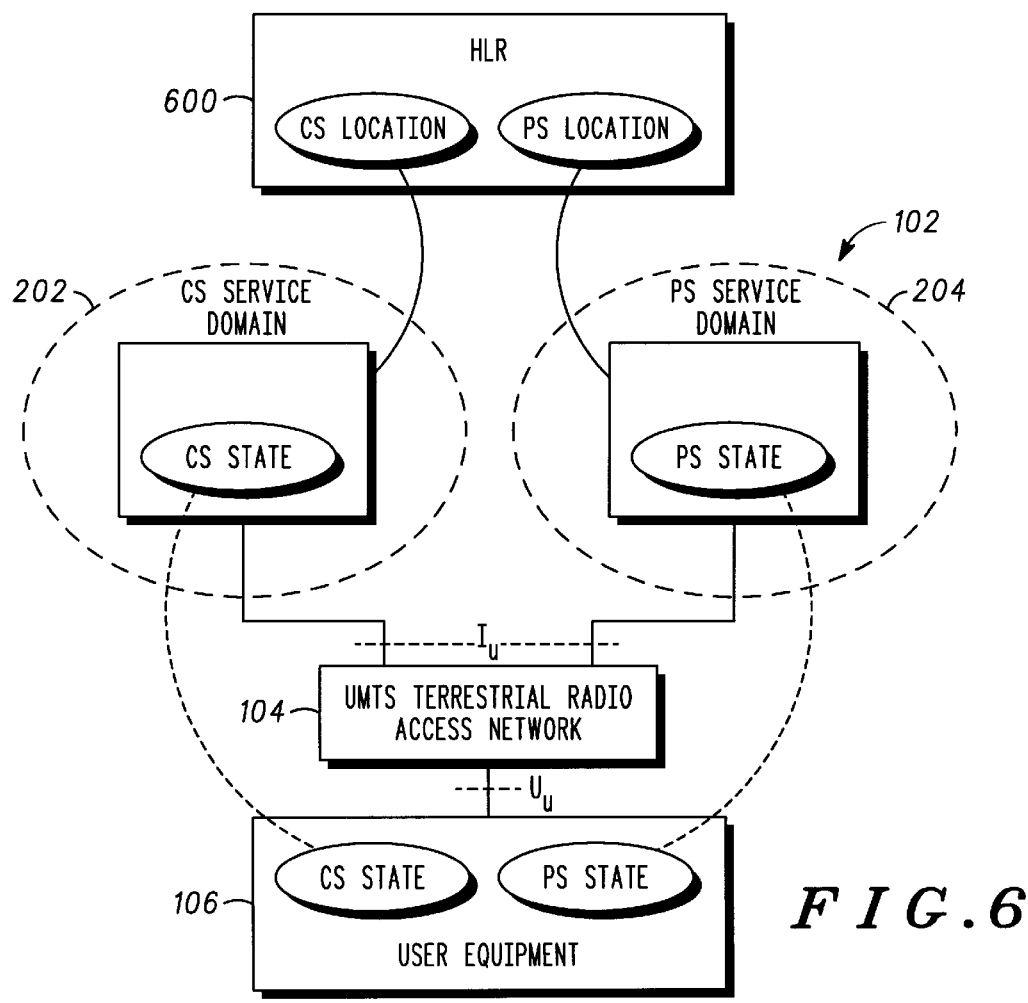
FIG. 6 is a circuit schematic in block diagram form illustrating a system in which one embodiment of the invention can be implemented.

An alternate embodiment will now be described with respect to FIG. 6. The system of FIG. 6 includes user equipment 106 operable in either the packet switched domain or the circuit switched domain. The user equipment 106 operates in a packet switch state in the packet switch domain and the circuit switch state in the circuit switch domain. The UMTS terrestrial access network directs a message or session to the circuit switch service domain 202 or the packet switch domain 204. The home location register 600 for the user equipment 100 stores information associated with the user equipment 106 in the circuit switch location and the packet switch location. When the user accesses a network, whether at home or roaming, the home location register 600 will provide the information associated with the user equipment to the accessed network. In this manner, the domain information for the user equipment can be located in the home location register instead of the user equipment, and the domain service selection can then be made transparently to the user.

In systems where there is a choice between the domains for a given service, and if the operator allows it, the user equipment can present those choices to the end-user through a user interface to allow the end-user to make the domain decision non-transparently.

Accordingly, it can be seen that an improved system for accessing a network serving multiple domains is disclosed. Those skilled in the art will recognize that although the system is described with respect to a particular system and standard, it will find application in other systems. Additionally, it can be seen that the insertion of domain selection information in user equipment communications can be advantageously employed even where the UMTS terrestrial access network does not transmit domain, application or service information to the user equipment. The user equipment can transmit a domain request and the UMTS terrestrial access network can accept or decline that request based upon available domains, applications, or services. This will result in a less intelligent request, but reduces the signaling overhead somewhat. Thus, while specific components and functions are described above, fewer or additional functions could be implemented by one skilled in the art within the broad scope of the present invention, and the invention should be limited only by the appended claims.

We claim:

1. A method of controlling routing in a cellular communication system serving user equipment and having a radio access network operably coupled to each core domain of a plurality of core network domains, wherein each core network domain of the plurality of core network domains switches messages in a manner different from the other core network domains of the plurality of core network domains, the method comprising the steps of:

receiving, by the radio access network, network services, applications, and domain information;

receiving, by the radio access network, a message from the user equipment;

selecting, by the radio access network, a core network domain from among the plurality of core network domains for a routing of the message based on at least one of a user equipment preference and a radio access network preference; and routing, by the radio access network, the incoming message to the core network domain selected by the radio access network.

2. The method of claim 1, further including the step of transmitting network services, applications and domain information to the user equipment.

3. The method of claim 2, wherein the message from the user equipment specifies a preferred core network domain based on the network services, applications and domain information transmitted to the user equipment.

4. The method of claim 2, wherein the message specifies a preferred core network domain for a routing of the message, which preferred core network domain is specified based on the network services, applications, and domain information transmitted to the user equipment.

5. The method of claim 1, wherein the radio access network selects the core network domain based on information received by the radio access network from a core network domain.

6. The method of claim 1, wherein, in the case of a conflict between a core network domain specified by the user equipment and a core network domain specified by the radio access network, the radio access network sends a clarifying message to the user equipment.

7. The method of claim 1, wherein the message specifies a preferred core network domain for a routing of the message.

8. The method of claim 7, wherein the radio access network selects the core network domain for the routing of the message based on the preferred core network domain specified in the message.

9. The method of claim 7, wherein the step of selecting, by the radio access network, a core network domain further comprises a step of overriding, by the radio access network, the core network domain specified in the message.

10. The method of claim 9, wherein the step of overriding comprises a step of overriding, by the radio access network, the core network specified in the message by a network equipment specified core network domain.

11. The method of claim 7, wherein the preferred core network domain is selected by a user of the user equipment.

12. The method of claim 7, wherein the preferred core network domain is selected by information previously sent to the user equipment.

13. A method of controlling a user equipment for a wireless communication system comprising a plurality of core network domains, wherein each core network domain of the plurality of core network domains switches messages in a manner different from the other core network domains of the plurality of core network domains, the method comprising the steps of:

storing preferences comprising a plurality of network services and applications that are each directed to a core network domain of the plurality of core network domains;

determining a preferred core network domain for utilization by the selected network service or application based on the stored preferences;

constructing a message in user equipment for communication to a radio access network, the message specifying the preferred core network domain for a routing of the message; and transmitting the constructed message to the radio access network.

14. The method of claim 13, wherein the user equipment inserts an application indicator in the transmitted message.

15. The method of claim 13, wherein the step of receiving a selection of a network service or application from among the plurality of network services and applications comprises steps of:

presenting a user of the user equipment with a plurality of service options for the user's use in selecting a voice, data, or voice and data communication, wherein the presented plurality of service options comprises a plurality of alternative routes for the voice, data, or voice and data communication, and wherein each alternative route of the plurality of alternative routes utilizes a core network domain that is different from the core network domain utilized by the other alternative routes of the plurality of alternative routes; and in response to the presentation of the plurality of service options, receiving a selection from the user of a service option of the plurality of service options.

16. The method of claim 15, further comprising the step of retrieving a core network domain corresponding to each service option of the plurality of service options from a memory in the user equipment.

17. The method of claim 15, further comprising the step of retrieving a core network domain for each service option of the plurality of service options from a SIM.

18. The method of claim 13, further including step of inserting the requested domain at the initiation of each service option request.

19. The method of claim 13, further including the step of receiving a message identifying service domain information for the network associated with the base, and selecting the domain using the received message.

20. The method of claim 19, further including the step of displaying service domain information to the user responsive to receiving the message identifying service domain information, and responding to user inputs for selecting the domain.

21. The method of claim 13, wherein the step of storing preferences comprises steps of:

receiving a selection, from a user of the user equipment, of a network service of application from among the plurality of network services and applications; and storing the user selection.

22. The method of claim 13, wherein the step of storing preferences comprises steps of:

receiving operator configured parameters from a radio access network, wherein the operator configured parameters comprises a plurality of network services and applications that are each preferentially directed to a core network domain of the plurality of core network domains by the operator of the wireless communication system;

storing the operator configured parameters.

23. The method of claim 22, wherein the step of determining a preferred core network domain comprises a step of retrieving, by the user equipment, a preferred core network domain based on the selected network service or application and the stored operator configured parameters.

24. The method of claim 13, wherein the step of storing preferences comprises steps of:

presenting at least one network service or application to the user;

receiving, from the user, a selection of a preferred core network domain of the plurality of core network domains for utilization by the at least one network service or application; and storing the at least one network service or application in association with the selected preferred core network domain.

25. The method of claim 13, wherein the step of transmitting the constructed message to the radio access network comprises a step of transmitting the constructed message to the radio access network over a radio interface that provides a common link to each core network domain of the plurality of core network domains.

26. User equipment for a cellular system having a network comprising a plurality of core network domains, wherein each core network domain of the plurality of core network domains switches messages in a manner different from the other core network domains of the plurality of core network domains, the user equipment comprising circuitry operable to store preferences comprising a plurality of network services and applications that are each directed to a core network domain of the plurality of core network domains, receive a selection of a network service or application from among the plurality of network services and applications, determine a preferred core network domain for utilization by the selected network service or application based on the stored user preferences, construct a message in the user equipment for communication to a radio access network, the message specifying the preferred core network domain for a routing of the message, and transmit the constructed message to the radio access network.

27. The user equipment of claim 26, wherein the selection is from a user of the user equipment.

28. The user equipment of claim 26, wherein the user equipment further receives operator configured parameters from a radio access network, wherein the operator configured parameters comprises a plurality of network services and applications that are each preferentially directed to a core network domain of the plurality of core network domains by the operator of the wireless communication system, and wherein the storing of preferences comprises storing the operator configured parameters.

29. The user equipment of claim 28, wherein the determining of a preferred core network domain comprises retrieving a preferred core network domain based on the selected network service or application and the stored operator configured parameters.

30. The user equipment of claim 26, wherein the user equipment further presents a network service or application to the user and receives, from the user, a selection of a preferred core network domain of the plurality of core network domains for utilization by the network service or application, and wherein the storing of user preferences comprises storing the network service or application in association with the selected preferred core network domain.

31. The method of claim 26, wherein the user equipment further presents a user of the user equipment with a plurality of service options for the user's use in selecting one of a voice, data, and voice and data communication, wherein the presented service options comprise a plurality of alternative routes for a selected voice, data, or voice and data communication, and wherein each-alternative route of the plurality of alternative routes utilizes a core network domain that is different from the core network domain utilized by the other alternative routes of the plurality of alternative routes, and wherein the receiving of a selection of a network service or application from among the plurality of network services and applications comprises receiving a selection from the user of a service option of the plurality of service options.

32. Network equipment comprising:

a core network comprising a circuit switch domain and a packet switch domain, wherein the circuit switch domain provides an alternative message routing system relative to the packet switch domain; and a radio access network operably coupled to each of the circuit switch domain and the packet switch domain that inspects incoming messages from user equipment to identify service applications, selects a domain from among the circuit switch domain and the packet switch domain for a routing of the message, and routes the incoming messages using the selected domain.

33. The network equipment as defined in claim 32, wherein the packet switch domain includes an IP network.

34. The network equipment as defined in claim 32, further including a home location register storing packet switch information and circuit switch information for the user equipment.

35. A cellular telephone communication system comprising:

network equipment having a plurality of core network domains, wherein each core network domain of the plurality of core network domains switches messages in a manner different from the other core network domains of the plurality of core network domains, and wherein the network equipment is operable to receive an incoming message from the user equipment, select a core network domain of the plurality of core network domains for a routing of the incoming message, and route the incoming message to the selected core network domain; and user equipment operable to construct a message for communication to the network equipment, the message specifying the requested service, and to transmit the constructed message to the network equipment.

36. The system of claim 35, wherein the network equipment further transmits network services, applications and domain information to the user equipment.

37. The system of claim 36, wherein the message specifies a preferred core network domain for a routing of the message, which preferred core network domain is specified based on the network services, applications, and domain information transmitted to the user equipment.

38. The system of claim 35, wherein the network equipment selects the core network domain for the routing of the message based on the preferred core network domain specified in the message.

39. The system of claim 35, wherein the network equipment selects the core network domain based on inspection of a message received by the network equipment from a core network domain.

40. The system of claim 35, wherein the network equipment overrides the preferred core network domain specified in the message when the network equipment selects a core network domain for a routing of the message.

* * * * *